United States Patent
Ramachandran

(10) Patent No.: US 8,037,420 B2
(45) Date of Patent: Oct. 11, 2011

(54) MAINTAINING BROWSER NAVIGATION RELATIONSHIPS AND FOR CHOOSING A BROWSER WINDOW FOR NEW DOCUMENTS

(75) Inventor: Puthukode G. Ramachandran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 10/728,160

(22) Filed: Dec. 4, 2003

(65) Prior Publication Data

US 2005/0125727 A1 Jun. 9, 2005

(51) Int. Cl.
*G06F 3/048* (2006.01)

(52) U.S. Cl. ........ 715/804; 715/781; 715/783; 715/802; 715/803

(58) Field of Classification Search ................ 715/781, 715/783, 802, 803, 804
See application file for complete search history.

(56) References Cited

U.S. PATENT DOCUMENTS

| | | | | |
|---|---|---|---|---|
| 5,404,316 | A * | 4/1995 | Klingler et al. | 715/723 |
| 5,412,776 | A * | 5/1995 | Bloomfield et al. | 715/783 |
| 5,497,454 | A * | 3/1996 | Bates et al. | 715/799 |
| 5,680,619 | A * | 10/1997 | Gudmundson et al. | 717/108 |
| 5,929,854 | A * | 7/1999 | Ross | 715/783 |
| 6,133,898 | A * | 10/2000 | Ludolph et al. | 715/790 |
| 6,356,908 | B1 * | 3/2002 | Brown et al. | 707/10 |
| 6,928,623 | B1 * | 8/2005 | Sibert | 715/783 |
| 7,117,447 | B2 * | 10/2006 | Cobb et al. | 715/762 |
| 7,568,149 | B2 * | 7/2009 | Edwards et al. | 715/205 |
| 2001/0028368 | A1 * | 10/2001 | Swartz et al. | 345/835 |
| 2002/0051017 | A1 * | 5/2002 | Wishoff | 345/774 |
| 2002/0085025 | A1 * | 7/2002 | Busis et al. | 345/738 |
| 2002/0186238 | A1 * | 12/2002 | Sylor et al. | 345/736 |
| 2003/0014415 | A1 * | 1/2003 | Weiss et al. | 707/10 |
| 2003/0169304 | A1 * | 9/2003 | Pagan | 345/843 |
| 2003/0221167 | A1 * | 11/2003 | Goldstein et al. | 715/513 |
| 2004/0085293 | A1 * | 5/2004 | Soper et al. | 345/156 |
| 2004/0261039 | A1 * | 12/2004 | Pagan | 715/797 |

OTHER PUBLICATIONS

IBM technical Disclosure Bulletin, Mar. 2002, UK, NNRD455178. Method to Open Hypertext Links in a Designated Window. Issue 455, p. 537. Published Mar. 1, 2002.*

* cited by examiner

*Primary Examiner* — Chat Do
*Assistant Examiner* — Stephen Alvesteffer
(74) *Attorney, Agent, or Firm* — Yee & Associates, P.C.; Libby Z. Toub

(57) ABSTRACT

A method, apparatus, and computer instructions for managing the display of a new document. In response to receiving a user input indicating that the new document is to be displayed, a list of browser windows including an indication of a presently displayed document in each respective browser window in the list of browser windows is displayed; and a document displayed in the browser window is replaced with the new document responsive to a user selection of a browser window from the list of browser windows.

20 Claims, 5 Drawing Sheets

MAINTAINING BROWSER NAVIGATION RELATIONSHIPS AND FOR CHOOSING A BROWSER WINDOW FOR NEW DOCUMENTS

BACKGROUND OF THE INVENTION

1. Technical Field

The present invention relates generally to an improved data processing system and in particular to a method and apparatus for processing documents. Still more particularly, the present invention relates to a method, apparatus, and computer instructions for selecting a browser window for new documents.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.).

The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

Oftentimes, a user may open multiple browser windows. These browser windows contain different Web pages or documents. The user may desire these windows to remain open based on reading or research being performed by the user. For example, if a user is reading a tutorial, the user may wish to have the table of contents in one browser window with other documents opened up in other browser windows. If a user selects a link or hyperlink on a Web page, the browser may open a new window to open the new page. Alternatively, the new page may be opened in the current window. Also, the document may be opened in one of the already opened windows. Presently, the user is unable to control which window is selected to open the document if the browser opens the document in another browser window that is already opened without dragging the mouse pointer to another window. If the user is using multiple browser windows, the user may want to overwrite one particular window, rather than the one selected by the browser program.

Therefore, it would be advantageous to have an improved method, apparatus, and computer instructions for maintaining browser navigation relationships and choosing a browser window for new Web pages or documents.

SUMMARY OF THE INVENTION

The present invention provides a method, apparatus, and computer instructions for managing the display of a new document, such as a Web page. In response to receiving a user input indicating that the new document is to be displayed, a list of browser windows is displayed. The list includes an indication of a presently displayed document in each respective browser window in the list of browser windows. A document displayed in the browser window is replaced with the new document in response to a user selection of a browser window from the list of browser windows.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
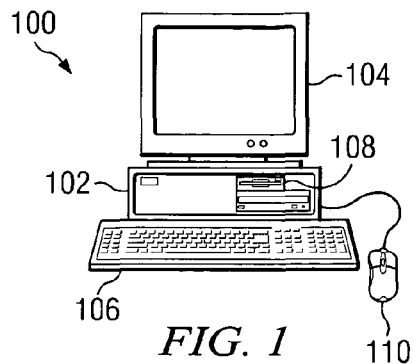
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
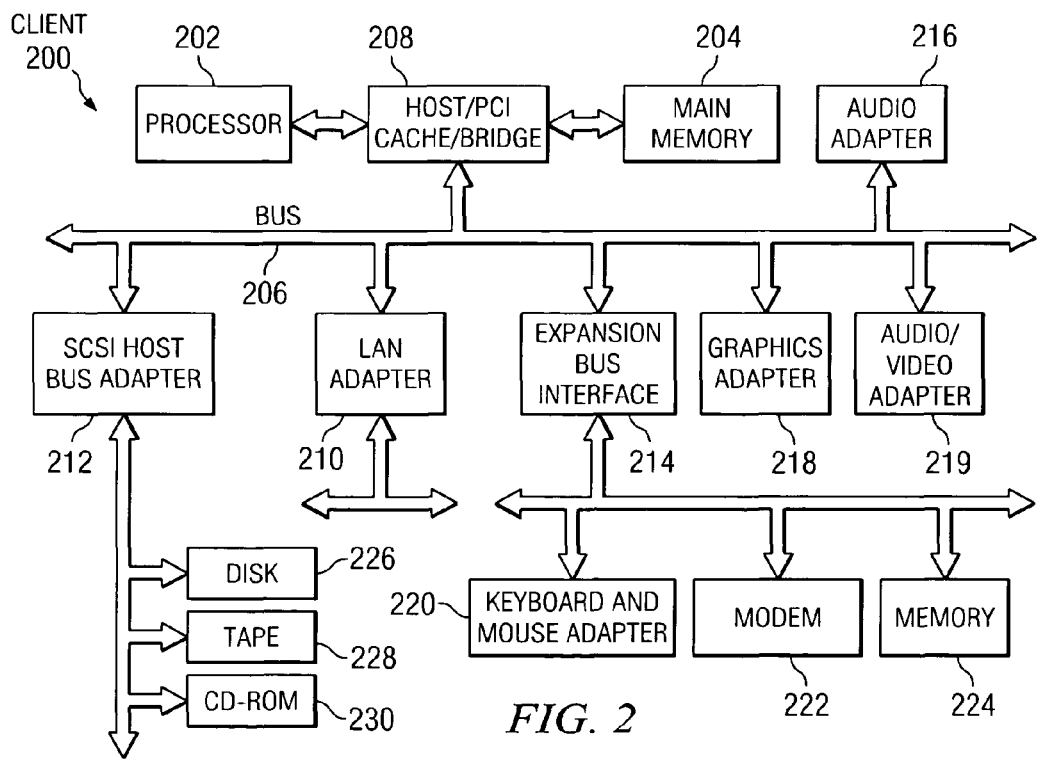
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection.

In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
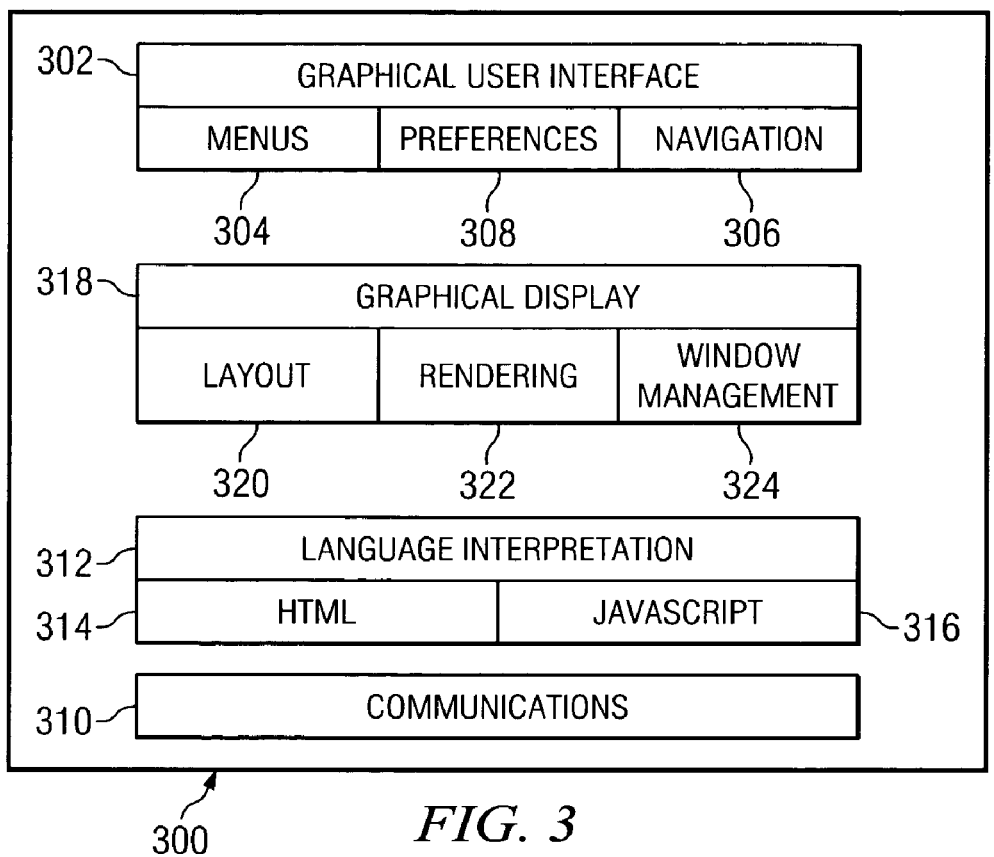
FIG. 3 is a block diagram of a browser program in accordance with a preferred embodiment of the present invention.

Turning next to FIG. 3, a block diagram of a browser program is depicted in accordance with a preferred embodiment of the present invention. A browser is an application used to navigate or view information or data in a distributed database, such as the Internet or the World Wide Web.

In this example, browser 300 includes graphical user interface (GUI) 302, that allows the user to interface or communicate with browser 300. This interface provides for selection of various functions through menus 304 and allows for navigation through navigation 306. For example, menus 304 may allow a user to perform various functions, such as saving a file, opening a new window, displaying a history, and entering a URL. Navigation 306 allows for a user to navigate various pages and to select Web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communications 310 uses HTTP. Other protocols may be used depending on the implementation. Documents that are received by browser 300 are processed by language interpretation 312, which includes an HTML unit 314 and a JavaScript unit 316. Language interpretation 312 will process a document for presentation on graphical display 318. In particular, HTML statements are processed by HTML unit 314 for presentation while JavaScript statements are processed by JavaScript unit 316.

Graphical display 318 includes layout unit 320, rendering unit 322, and window management 324. These units are involved in presenting Web pages to a user based on results from language interpretation 312.

Browser 300 is presented as an example of a browser program in which the present invention may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as Microsoft Internet Explorer, which is available from Microsoft Corporation.

In the depicted examples, the mechanism of the present invention may be implemented in graphical display 318 within browser 300.

The present invention provides a method, apparatus, and computer instructions for maintaining browser navigation relationships and selecting browser windows for new Web pages. Currently, most browser programs will open a new document in the last active browser window. Active browser window is the window that was last used for viewing a Web page. The mechanism of the present invention allows a user to select a browser window in which a new Web page or document may be opened. The user chooses whether to open a document in an existing window, a new window, or a selected current window. This input may be received in a currently active browser window as shown in the illustrative examples below. Further, the user is able to limit the ways in which currently opened browser windows may be used.

Figure 4A:
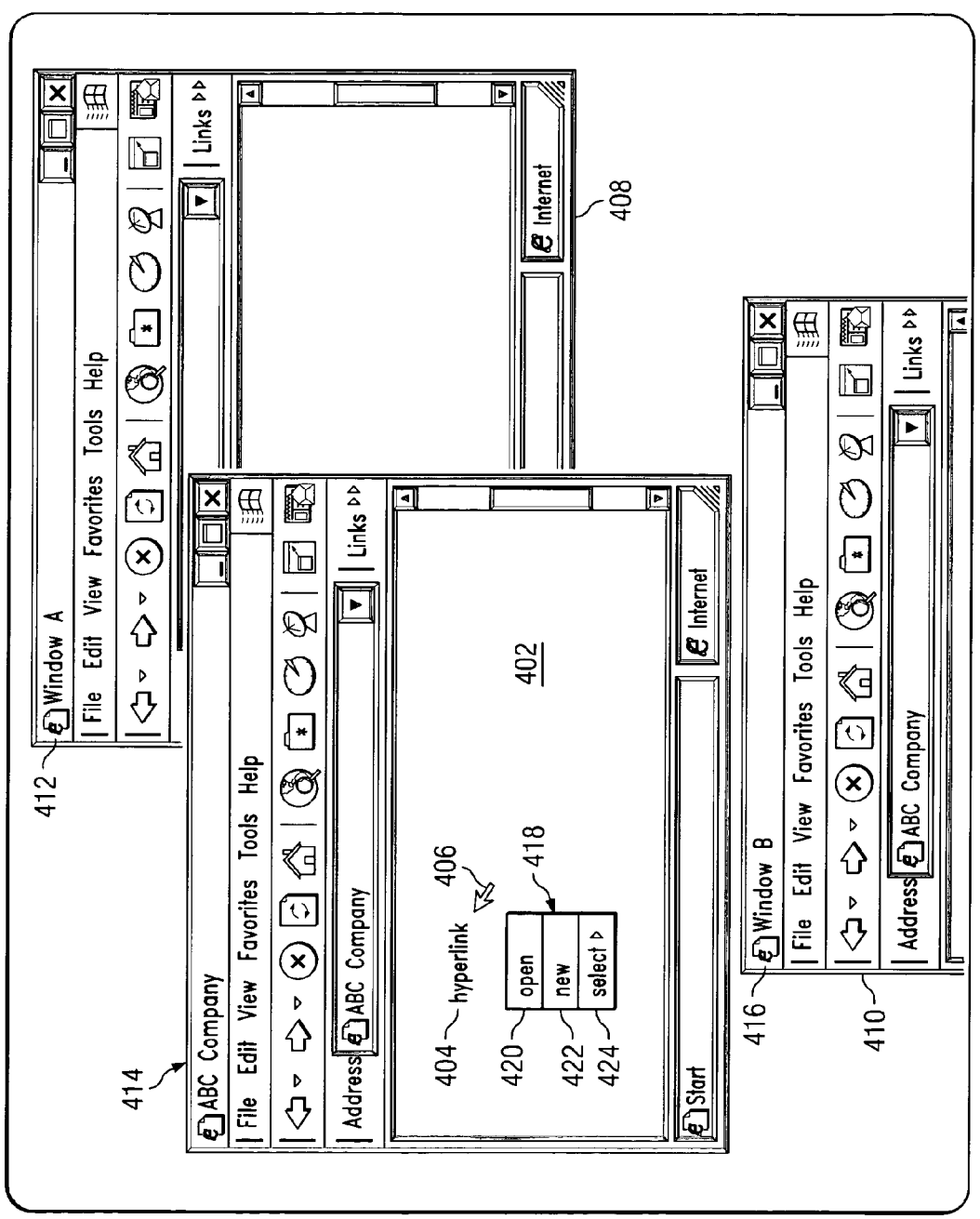
FIGS. 4A and 4B are diagrams illustrating a graphical user interface for allowing a user to control the opening of browser windows for documents in accordance with a preferred embodiment of the present invention.
Figure 4B:
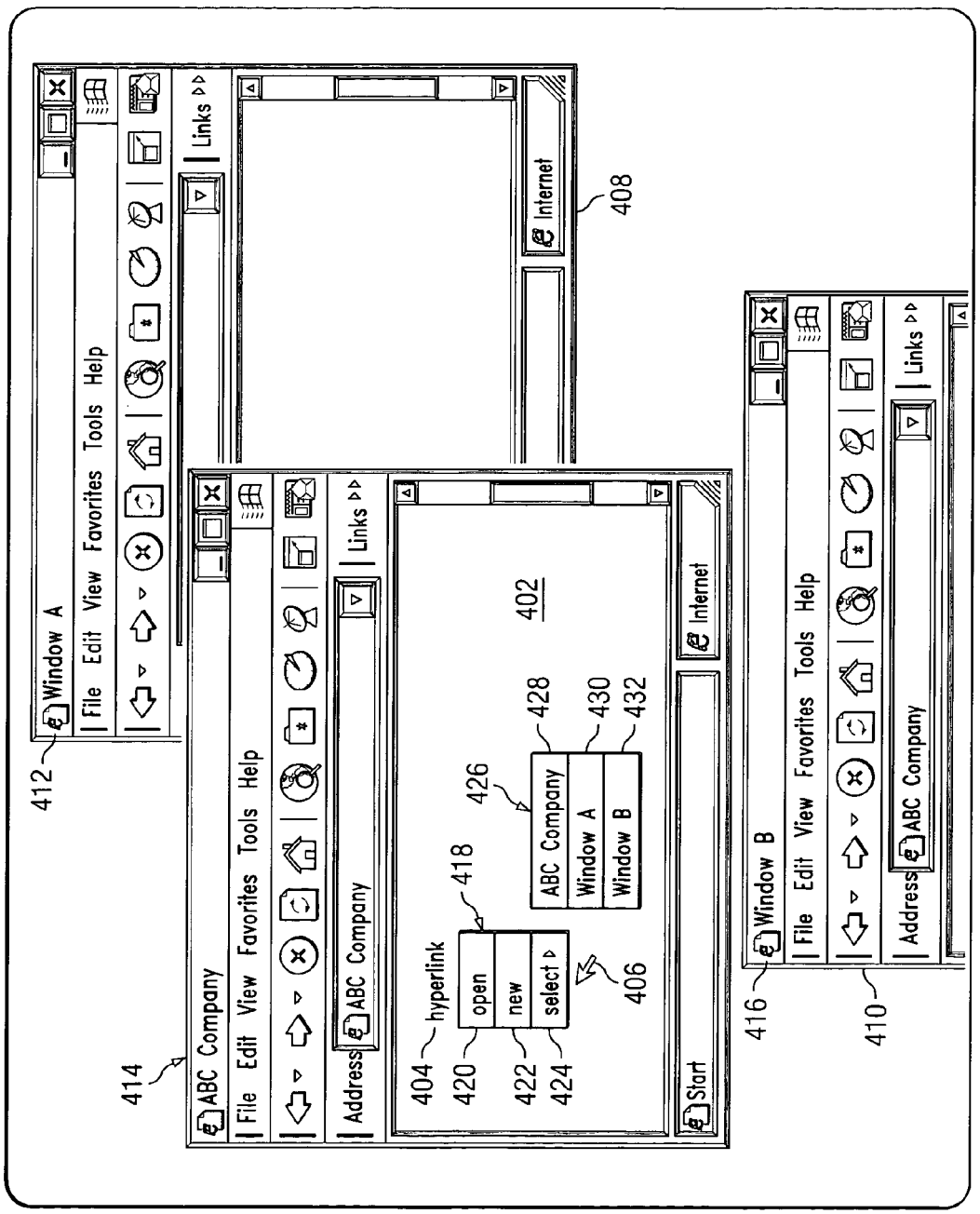

Turning now to FIGS. 4A and 4B, diagrams illustrating a graphical user interface for allowing a user to control the opening of browser windows for documents, such as Web pages, is depicted in accordance with a preferred embodiment of the present invention. In this example, display 400 contains browser window 402. Hyperlink 404 is located within browser window 402. When a user moves pointer 406 over hyperlink 404, the user may select that hyperlink.

Currently, without the present invention, selection of such a hyperlink may cause a document, such as a Web page, to be opened in the current window, a new window, or another already opened window, such as browser window 408 or browser window 410. As illustrated, only a portion of browser window 408 is shown because browser window 402 obscures other portions of browser window 408. In this example, the document displayed in browser window 402 is named "ABC Company" as shown in title bar 414 in browser window 402.

The mechanism of the present invention allows the user to have control over the opening of browser windows. In response to a selected user input, such as a right-click on hyperlink 404, menu 418 is displayed in proximity with pointer 406. Menu 418 includes the options open 420, new 422, and select 424. Browser window 408 is entitled "Window A" as shown in title bar 412 in browser window 408, and browser window 410 is entitled "Window B" as shown in title bar 416 in browser window 410.

If the user selects the option, open 420, the document associated with hyperlink 404 is opened in the current browser window, browser window 402. If the user selects new 422, the document associated with hyperlink 404 is opened in a new browser window. By selecting the option, select 424, sub-menu 426 is displayed. The sub-menu contains a list of browser windows currently active in display 400. In these examples, the browser windows listed in submenu 426 include ABC Company 428, Window A 430, and Window B 432.

In the illustrative examples, the identification of the active browser windows is based on the document names found in the title bars of the browser windows. Of course, other types of identifiers may be used depending on the particular implementation. The user may now select one of the browser windows in which the new document is to be opened. In this manner, the user may select the existing browser window in which the document is to be opened rather than leaving the selection to the browser program.

Further, upon selecting a particular browser window from the list in sub-menu 426, the selected browser window is moved up in the window hierarchy to become the last active browser window. Currently, active browser windows in a display are listed in a hierarchy in the order in which the browser windows were opened. The last opened or active browser window is the top of the window hierarchy. This is the browser window typically used to display a new document when a currently open window is selected for use.

The illustrated examples in FIG. 4 may be used with the opening of any document that may be handled by a browser. A document herein includes for example, a Web page, an image, or a spreadsheet.

Figure 5:
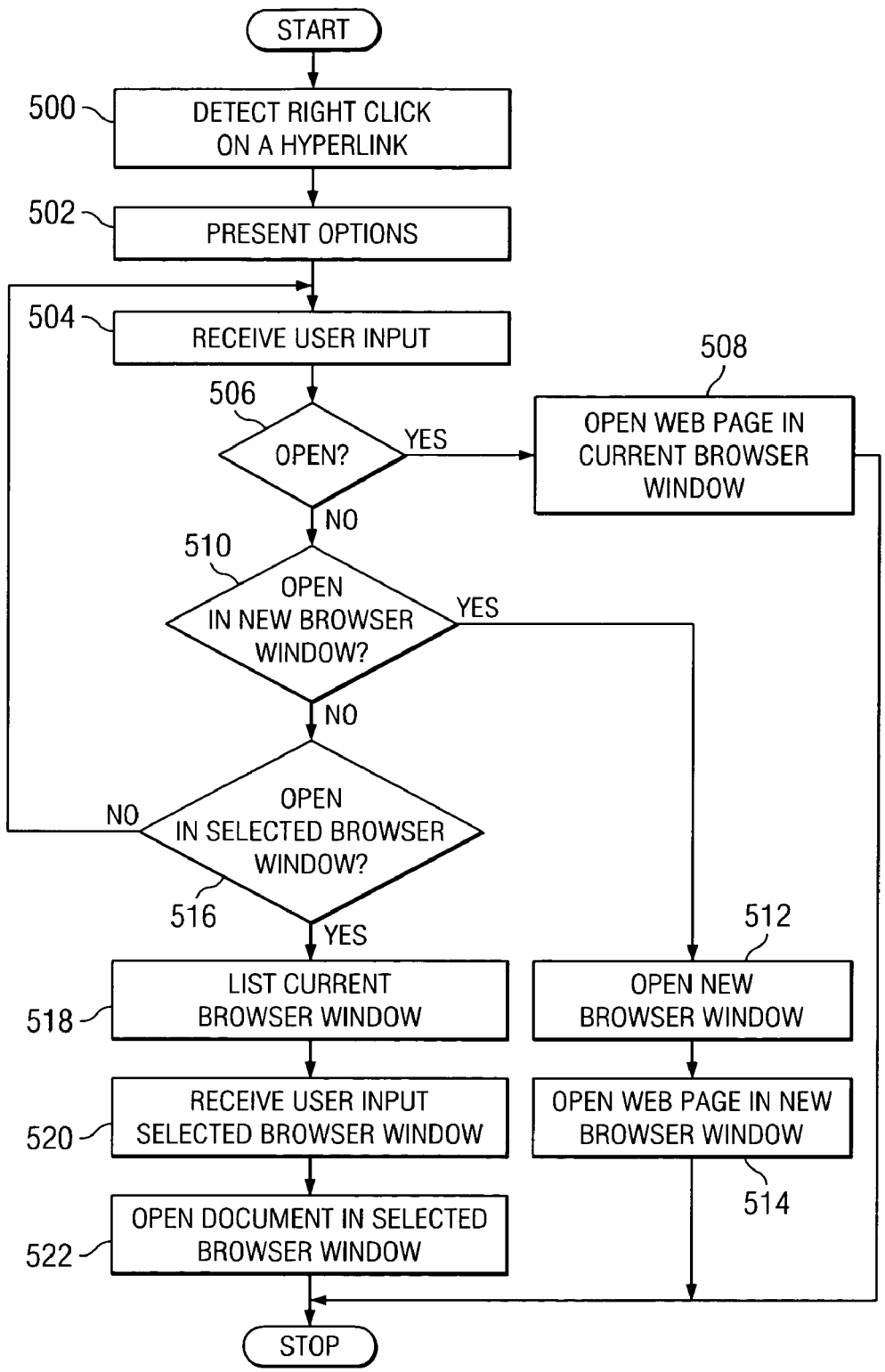
FIG. 5 is a flowchart of a process for displaying Web pages in browser windows in accordance with a preferred embodiment of the present invention.

With reference now to FIG. 5, a flowchart of a process for displaying Web pages in browser windows is depicted in accordance with a preferred embodiment of the present invention. The process illustrated in FIG. 5 may be implemented in a browser, such as browser 300 in FIG. 3. This process may be applied to other types of documents other than Web pages.

The process begins by detecting a right-click on a hyperlink (step 500). Options are then presented to the user (step 502). Step 502 involves displaying the options in a menu format, such as menu 408 in FIG. 4. Thereafter, user input is received (step 504).

A determination is made as to whether the user input is to open the document in the current window (step 506). If the user input is to open the Web page in the current window, the Web page is opened in the current browser window (step 508) with the process terminating thereafter.

With reference again to step 506, if the user input is not to open the Web page in the current browser window, a determination is made as to whether input is to open the Web page in a new browser window (step 510). If the user input is to open the Web page in a new browser window, then a new browser window is opened (step 512). Thereafter, the Web page is opened in the new browser window (step 514) with the process terminating thereafter.

With reference again to step 510, if the user input is not to open the Web page in a new browser window, a determination is made as to whether the user input is to open the Web page in a selected browser window (step 516). If the user input is not to open the Web page in a selected browser window, the process returns to step 504 as described above. Otherwise, a list of currently active browser windows are displayed (step 518). In these examples, this list is displayed in a menu, such as sub-menu 426 in FIG. 4B.

Thereafter, user input selecting a browser window is received (step 520). The Web page is then opened in the selected browser window (step 522) with the process terminating thereafter. Further, when the Web page is opened in the new browser window, the selected browser window is promoted to the top of the window hierarchy.

Thus, the present invention provides an improved method, apparatus, and computer instructions for managing the displaying of documents, such as Web pages, in a set of browser windows. The mechanism of the present invention allows a user to identify a particular browser window that will be used to open the new Web page, rather than allowing the browser program to select the browser window. In this manner, a user is able to control which browser windows are used for new Web pages. This type of control provides an advantage in that a user is able to keep Web pages with desired information from being replaced with new Web pages while reading documents or Web pages.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing display of a new document, the method comprising data processing system implemented steps of:
    displaying, in response to receiving an initial user input indicating that the new document is to be displayed, a menu of commands associated with opening the new document including: (i) a current browser window command, (ii) a new browser window command, and (iii) a selected browser window command;
    concurrently displaying, in response to receiving another user input selecting the selected browser window command from the menu of commands, a list of currently active browser windows including an indication of a presently displayed document in each respective browser window in the list of currently active browser windows, wherein the list of currently active browser windows, including the indication of the presently displayed document in each respective browser window in the list of currently active browser windows, that is concurrently displayed is a list consisting of all currently active browser windows; and
    replacing, in response to a user selection of a browser window from the list of currently active browser windows, a document displayed in the browser window with the new document.

2. The method of claim 1 further comprising:
    promoting the browser window to a top of a window hierarchy such that the browser window is subsequently used when displaying another new document when the current browser window command is selected during a subsequent opening of the another new document.

3. The method of claim 2, wherein the window hierarchy is represented by the list of currently active browser windows, and the browser window is presented as a first item in the list of currently active browser windows when the list of currently active browser windows is next displayed in response to subsequent user input.

4. The method of claim 1, wherein the receiving step and the replacing step are performed by a Web browser.

5. The method of claim 1, wherein the new document is selected from one of a Web page, an image, or a spreadsheet.

6. The method of claim 1, wherein the user input is received in a currently active browser window.

7. The method of claim 1, wherein the initial user input selects a hyperlink that is a uniform resource locator (URL) of the new document to be displayed.

8. The method of claim 7, wherein the indication is a document name from a title bar for the each respective browser window.

9. The method of claim 7, wherein the indication is a thumbnail of the document displayed in each respective browser window.

10. A data processing system for managing display of a new document on a video display of the data processing system, the data processing system comprising:
    the video display;
    first instructions responsive to receiving an initial user input indicating that the new document is to be displayed, to display a menu of commands associated with opening the new document including: (i) a current browser window command, (ii) a new browser window command, and (iii) a selected browser window command;
    second instructions, responsive to receiving another user input selecting the selected browser window command, to display on the video display of the data processing system a list of currently active browser windows including an indication of a presently displayed document in each respective browser window in the list of currently active browser windows, wherein the list of currently active browser windows, including the indication of the presently displayed document in each respective browser window in the list of currently active browser windows, that is concurrently displayed is a list consisting of all currently active browser windows; and
    third instructions, responsive to a user selection of a browser window from the list of currently active browser windows, to replace a document displayed in the browser window with the new document.

11. The data processing system of claim 10 further comprising:
    fourth instructions to promote the browser window to a top of a window hierarchy such that the browser window is subsequently used when displaying another new document when the current browser window command is selected during a subsequent opening of the another new document.

12. The data processing system of claim 10, wherein the indication is a document name from a title bar for the each respective browser window.

13. The data processing system of claim 10, wherein the indication is a thumbnail of the document displayed in each respective browser window.

14. The data processing system of claim 10, wherein the receiving means and the replacing means are performed by a Web browser.

15. A computer program product encoded in a computer readable, recordable-type medium and operable in a data processing system for managing display of a new document, the computer program product comprising:
    first instructions, responsive to receiving an initial user input indicating that the new document is to be displayed, to display a menu of commands associated with opening the new document including: (i) a current browser window command, (ii) a new browser window command, and (iii) a selected browser window command;
    second instructions, responsive to receiving another user input selecting the selected browser window command, to concurrently display a list of currently active browser windows including an indication of a presently displayed document in each respective browser window in the list of currently active browser windows, wherein the list of currently active browser windows, including the indication of the presently displayed document in each respective browser window in the list of currently active browser windows, that is concurrently displayed is a list consisting of all currently active browser windows; and third instructions, responsive to a user selection of a browser window from the list of currently active browser windows, to replace a document displayed in the browser window with the new document.

16. The computer program product of claim 15 further comprising:

fourth instructions to promote the browser window to a top of a window hierarchy such that the browser window is subsequently used when displaying another new document when the current browser window command is selected during a subsequent opening of the another new document.

17. The computer program product of claim 15, wherein the indication is a document name from a title bar for the each respective browser window.

18. The computer program product of claim 15, wherein the indication is a thumbnail of the document displayed in each respective browser window.

19. The computer program product of claim 15, wherein the first instructions and the second instructions are performed by a Web browser.

20. A data processing system comprising:

a bus system;

a memory connected to the bus system, wherein the memory includes a set of instructions; and a processing unit connected to the bus system, wherein the processing unit executes the set of instructions to receive an initial user input indicating that a new document is to be displayed, a menu of commands associated with opening the new document including: (i) a current browser window command, (ii) a new browser window command, and (iii) a selected browser window command; to receive another user input selecting the selected browser window command, wherein a list of browser windows is concurrently displayed including an indication of a presently displayed document in each respective browser window in the list of browser windows, wherein the list of currently active browser windows, including the indication of the presently displayed document in each respective browser window in the list of currently active browser windows, that is concurrently displayed is a list consisting of all currently active browser windows; and replace a document displayed in the browser window with the new document in response to a user selection of a browser window from the list of browser windows.

* * * * *